(12) United States Patent
Postal

(10) Patent No.: US 9,654,547 B2
(45) Date of Patent: May 16, 2017

(54) METHOD FOR ENABLING HIERARCHICAL ARCHITECTURE OF DEVICE MANAGEMENT GATEWAYS

(71) Applicant: SAMSUNG ELETRÔNICA DA AMAZÔNIA LTDA., Manaus-Am (BR)

(72) Inventor: Antonio Henrique Barbosa Postal, Campinas (BR)

(73) Assignee: SAMSUNG ELETRÔNICA DA AMAZÔNIA LTDA., Campinas-SÃO Paulo (BR)

( * ) Notice: Subject to any disclaimer, the term of this patent is extended or adjusted under 35 U.S.C. 154(b) by 395 days.

(21) Appl. No.: 14/300,763

(22) Filed: Jun. 10, 2014

(65) Prior Publication Data

US 2015/0236889 A1 Aug. 20, 2015

(30) Foreign Application Priority Data

Feb. 14, 2014 (BR) .......................... 1020140035800

(51) Int. Cl.
  *H04L 29/08* (2006.01)
  *H04L 12/24* (2006.01)
  *H04W 4/00* (2009.01)

(52) U.S. Cl.
  CPC ........ *H04L 67/10* (2013.01); *H04L 29/08567* (2013.01); *H04L 41/0213* (2013.01); *H04L 41/0803* (2013.01); *H04L 41/12* (2013.01); *H04W 4/001* (2013.01)

(58) Field of Classification Search
  CPC ....... H04L 12/24; H04L 29/06; H04L 41/021; H04L 41/023; H04L 67/125; H04L 9/3234; H04L 29/08567; H04L 41/12; H04L 41/0213; H04W 24/00; H04W 24/02; H04W 4/00; H04W 4/001
  See application file for complete search history.

(56) References Cited

U.S. PATENT DOCUMENTS

| | | | | |
|---|---|---|---|---|
| 2006/0031449 A1* | 2/2006 | Hallamaa | ............... | H04L 67/125 709/223 |
| 2009/0044185 A1* | 2/2009 | Krivopaltsev | .......... | H04L 29/06 717/173 |
| 2009/0111467 A1* | 4/2009 | Chai | ........................ | H04L 12/24 455/435.1 |
| 2011/0010383 A1* | 1/2011 | Thompson | .......... | H04L 41/0213 707/769 |
| 2012/0047551 A1* | 2/2012 | Pattar | ....................... | H04W 4/00 726/1 |
| 2013/0142129 A1* | 6/2013 | Rinne | .................... | H04W 24/00 370/329 |
| 2013/0198838 A1* | 8/2013 | Schmidt | ................. | H04L 9/3234 726/22 |

(Continued)

*Primary Examiner* — Le H Luu
(74) *Attorney, Agent, or Firm* — Staas & Halsey LLP

(57) ABSTRACT

In the field of telecommunications technology, a method for enabling Hierarchical Architecture of device management gateways is applicable to a remote management system having a server and multiple devices that are connected through one or more gateways in multi-level Hierarchical Architecture of Gateways, with a tree structure. More specifically, the method enables a new functionality required for the OMA-DM Gateway MO (GwMO): support for Hierarchical Architecture of Gateways.

17 Claims, 7 Drawing Sheets

(56) References Cited

U.S. PATENT DOCUMENTS

2013/0294285 A1\* 11/2013 Zhang ................... H04W 24/02
 370/254
2015/0193490 A1\* 7/2015 Park ................... H04L 41/0233
 707/797

\* cited by examiner

METHOD FOR ENABLING HIERARCHICAL ARCHITECTURE OF DEVICE MANAGEMENT GATEWAYS

CROSS-REFERENCE TO RELATED APPLICATIONS

This application claims the priority benefit of Application No. 10 2014 003580 0, filed Feb. 14, 2014, in the Brazilian Intellectual Property Office, the disclosure of which is incorporated herein by reference.

BACKGROUND

1. Field

The following description relates to the field of telecommunications technology and is applicable to remote management system including a server and multiple devices connected through one or more gateways in a multi-level Hierarchical Architecture of Gateways, with a tree structure. More specifically, the following description describes a method that enables a new functionality for the Open Mobile Alliance-Device Management (OMA-DM) Gateway MO (GwMO): support for Hierarchical Architecture of Gateways.

2. Description of the Related Art

Gateway MO V1.0 [GwMO_TS_V10] introduced the concept of DM-Gateway (Device Management Gateway): an entity that facilitates the interaction between a management server and a management client, at least one of which runs OMA-DM, in situations where it is not possible for direct interaction and without help between the management server and management client. The documents cited in the reference section are incorporated herein by reference in its entirety.

GwMO V1.0 [GwMO_TS_V10] achieved several advantages when compared to the traditional architecture involving only the DM Server and DM Client and alleviated the DM Server in managing each End Device individually. Thanks to GwMO V1.0, the DM Gateway is able to manage the End Devices behind it, on behalf of the Server.

The following functionalities are covered by GwMO V1.0:

Many End Devices can be organized and managed together as a specific Device Group.

DM commands originated by the Server may be distributed to multiple End Devices that are attached to the Gateway, known as "Command Fanout". The Server sends management commands to the Gateway and the Gateway forwards the commands to one or many End Devices that were pre-grouped into a specific Device Group.

After a "Command Fanout" execution, the collection of the responses of multiple End Devices attached to the Gateway are grouped into a single response is sent back to the server, and is known as "Response Aggregation". After the DM Gateway receives the responses sent by the End Device(s), the Gateway may notify the Server about the command completion status, or it may send the aggregated response of the command, from multiple End Devices, to the DM Server.

The DM Gateway is able to distribute software images to End Devices associated to that Gateway on behalf of the Server. The Server can deliver the image to the Gateway and the Gateway distributes that image to many End Devices specified by a Device Group.

However, GwMO V1.0 [GwMO_TS_V10], with just one DM Gateway level between the server and client (FIG. 1), presents some limitations in terms of flexibility and scalability.

The GwMO V1.1 Requirement Document (RD) [GwMO_RD_V11] has introduced the definition and the requirements for a multi-level architecture called Hierarchical Architecture. A Hierarchical Architecture refers to as a multi-level tree structure composed of a DM Server, DM Gateways, and End Devices. A DM server is located at the top of the tree. End Devices are located at the leaves of the branches. DM Gateways are cascaded in branches between a DM Server and End Devices. Hierarchical Architecture addresses large networks with a great number of End Devices, in a scalable way.

In Hierarchical Architecture topology, defined by GwMO V1.1 RD, it is possible that a parent DM Gateway may be associated to one or more child DM Gateways, in addition to the regular End Devices previously defined in GwMO V1.0.

The introduction of Hierarchical Architecture will add scalability and flexibility to the previous version GwMO V1.0 as follows:

Scalability: The maximum number of supported End Devices is no longer limited to the capacity of one DM Gateway connection, in order to support larger networks as M2M (Machine-to-Machine Communication) networks such as Power-Grids involving thousands or millions of devices. For example, in a tree-like Hierarchical Architecture with 3 levels of Gateways, where each one could manage 50 connections, up to 2551 ($1+50+50^2$) DM Gateways would be able to manage up to 125 thousand End Devices ($50^3$) in behalf of one single DM Server.

Flexibility: more convenient management topologies may be designed based on geographic, functional, or organizational criteria. Example: Gateways may be dedicated to specific locations (e.g. building, building floor, block, office), specific functions (e.g. energy consumption metering, security, cooling-heating systems) or organization (department, division, branches).

In order to support the Hierarchical Architecture, GwMO V1.1 Requirement Document (RD) [GwMO_RD_V11] has defined the requirements for GwMO to be able to manage child Gateways, in addition to the regular End Devices as defined in V1.0:

Ability to configure specific Connect-Disconnect Alerts for child DM Gateways.

Ability to configure specific report Alerts for Child DM Gateways.

Ability to configure specific Images provisioning for Child DM Gateways.

Ability to configure specific groups for Child DM Gateways, for "Command Fanout" to child DM Gateways and "Response Aggregation" from child DM Gateways.

The GwMO V1.0 Architecture Document (AD) has previously presented the interface between the DM Gateway and its associated End Devices. Aligned with the HA requirements, the GwMO V1.1 Architecture Document (AD) [GwMO_AD_V11] has extended the interface between DM Gateway-End Device into a new relationship and interface between Parent Gateway-Child Gateway. Due to these differences, a DM Gateway now needs to know which kind of devices it is associated to, in its immediate lower level: either an End Device or a Child DM Gateway, in order to invoke/expose the proper interface.

In order to comply with the requirements according to [GwMO_RD_V11] and with the proposed architecture design according to [GwMO_AD_V11], there is a need to differentiate in the Device Inventory which types of devices a DM Gateway is associated to, in the immediate lower-level:

An End Device.

A Child DM Gateway.

That differentiation, leveraged on previously existing GwMO V1.0 objects, will enable the requirements and architectural aspects for HA raised above, as will be described below in detail.

The prior art presents some solutions that aim to meet the requirements and architecture to support Hierarchical Architecture of Gateways.

The patent document WO2011021865, titled: TECHNIQUES FOR CONTROLLING GATEWAY FUNCTIONALITY TO SUPPORT DEVICE MANAGEMENT IN A COMMUNICATION SYSTEM, by Samsung Electronics, published on Feb. 24, 2011, presents techniques and algorithms for controlling gateway functionality in order to support Device Management (OMA-DM), in a communication system including a DM server, a device and just one DM Gateway in-between. The document WO2011021865 includes many management aspects which were incorporated in OMA-DM GwMO V1.0, which specifies a flat, non-hierarchical topology with just one level of gateway. It differs from the present disclosure, which addresses a multi-level, tree-like, Hierarchical Architecture of Gateways, object of next version under development, the GwMO V1.1, which extends V1.0 in a more flexible and scalable way. Moreover, the present disclosure provides a method and the means to enable and realize the Hierarchical Architecture, leveraging on functionalities available in GwMO V1.0.

The patent document US2012059924, titled METHOD AND APPARATUS FOR PERFORMING DEVICE MANAGEMENT THROUGH A GATEWAY DEVICE AND DEVICE MANAGEMENT SERVER, by Huawei, published on Mar. 8, 2012, is also based on OMA-DM and a system including a DM server, a device and a DM-Gateway in-between. More specifically, the document US2012059924 proposes a method for the DM Server to send a DM notification through the DM Gateway. The document US2012059924 covers a specific aspect of Device management in a flat, non-hierarchical topology with just one level of gateway. It differs from the present disclosure, which addresses a multi-level, tree-like, Hierarchical Architecture of Gateways, and it proposes a method to realize and to enable the Hierarchical Architecture requirements and architecture design.

The patent document WO2011122816, titled: TECHNIQUES FOR MANAGING DEVICES NOT DIRECTLY ACCESSIBLE TO DEVICE MANAGEMENT SERVER, by Samsung Electronics, published on Oct. 6, 2011, is also based on OMA-DM and on a flat, non-hierarchical, one-level Gateway topology, including a DM Server, a device, and a DM Gateway in-between. It addresses a specific issue related to handling a change in the device address. Conversely, the present disclosure addresses a multi-level, tree-like, Hierarchical Architecture of Gateways and proposes a method to realize the Hierarchical Architecture requirements and architecture design, leveraging on functionalities available in GwMO V1.0.

The patent document US2013130673 titled: METHOD, DEVICE AND SYSTEM FOR MANAGEMENT DEVICE, by Huawei, published on May 23, 2013, is also based on OMA-DM and on a flat, non-hierarchical, one-level Gateway topology, including a DM Server, a device, and just one DM gateway in-between. The method is related to the configuration and handling of a Uniform Resource Locators (URLs) at the WAN side as an identifier for the Gateway at the LAN side. It differs from the present disclosure, which addresses a multi-level structure, tree-like, Hierarchical Architecture of Gateways, and proposes a method to realize and to enable the Hierarchical Architecture requirements and architecture design.

The patent document WO2012174987, titled TERMINAL MANAGEMENT METHOD AND DEVICE, by Huawei, published on Dec. 27, 2012, is also based on OMA-DM and on a flat, non-hierarchical, one-level Gateway topology, including a DM server, a device, and just one DM Gateway in-between. It addresses the aspects of the batch management of devices by a gateway, similar to the device grouping, fanout command, and response aggregation embodied in GwMO V1.0. It differs from the present disclosure, which addresses a multi-level, tree-like, Hierarchical Architecture of Gateways and proposes a method to realize and to enable the Hierarchical Architecture requirements and architecture design.

The patent document US2013294285, titled METHOD FOR MANAGING A Remotely SENSOR NETWORK TOPOLOGY AND GATEWAY, by Huawei, published on Nov. 7, 2013, is also based on OMA-DM and on a flat, non-hierarchical, one-level Gateway topology including a DM server, a device—called "sensor" in the document US2013294285—and just one DM Gateway in-between. It addresses how a new device is discovered and notifies its connection to the gateway, similar to the Alert handling mechanism embodied in GwMO V1.0, in Device Info MO. The Device info MO is used to maintain information about the handling of different types of End Devices by DM Gateway, based on specified device groups. The document US2013294285 differs from the present disclosure, which addresses a multi-level, tree-like, Hierarchical Architecture of Gateways, and proposes a method to realize and to enable the Hierarchical Architecture requirements and architecture design.

The patent document EP1365557A2 titled: DEVICE-SHARING SYSTEM, DEVICE ADMINISTRATION TERMINAL, GATEWAY TERMINAL, AND METHOD FOR PROVIDING A DEVICE-SHARING SERVICE, by Seiko Epson, published on Nov. 26, 2003, addresses a home gateway interacting with one or more other home gateways for managing devices, such as printers or scanners through the internet but, differently than the present disclosure, those gateways are not organized in a Hierarchical, multi-level, tree-like Architecture, where a parent gateway can manage one or more child Gateways, for increased flexibility and scalability.

SUMMARY

Additional aspects and/or advantages will be set forth in part in the description which follows and, in part, will be apparent from the description, or may be learned by practice of the invention.

The following description relates to the telecommunication field of technology and to the remote management systems composed of a server connected to multiple devices through gateways in a multi-level Hierarchical Architecture.

Without loss of generality, the present disclosure focuses on one embodiment where the management protocol among the management Server, Gateways and the End Device is Open Mobile Alliance Device Management [OMA-DM], open standard for device management. More specifically, it is based on an OMA-DM area, the GwMO the V1.0 (Gateway Management Object V1.0) [GwMO_TS_V10] and on the DM Gateway functionality introduced by GwMO.

Leveraging on previously existing functionality in GwMO V1.0, the method proposed in the present disclosure enables the Hierarchical Architecture functionality as foreseen in GwMO V1.1 Requirements and Architecture, by introducing a new node in Inventory MO, which is resident in the DM Gateway, for every device Record entry, the ComponentType node which is able to differentiate which type of components are directly connected to a specific DM Gateway, in the immediate lower level: an End Device component or Child DM Gateway component. At the same time, this approach is flexible enough to distinguish different classes of End Devices of different classes and Child Gateways, if required.

By allowing this differentiation the introduced ComponentType node of the present disclosure is able to leverage on existing functionality in order to enable the new Hierarchical Architecture requirements specified in GwMO V1.1 Requirements Document (RD) [GwMO_RD_V11] and the new Gateway-Gateway interfaces defined for Hierarchical Architecture in GwMO V1.1 Architecture Document (AD) [GwMO_AD_V11]:

Ability to manage, via DM Commands, End Devices and/or Child DM Gateways via one or more intermediate DM Gateways in a tree branch.

Ability to configure specific Connect-Disconnect Alerts for Child DM Gateways.

Ability to configure specific report DM Alerts for Child DM Gateways.

Ability to configure specific Software Images provisioning for child DM Gateways.

Ability to configure specific groups for child DM Gateways, required for Command Fanout and Response Aggregation from child DM Gateways.

BRIEF DESCRIPTION OF THE DRAWINGS

The objectives and advantages of the present disclosure will become apparent from the following detailed description of an exemplary and non-limitative embodiment from the following figures, wherein.

DETAILED DESCRIPTION

Figure 1:
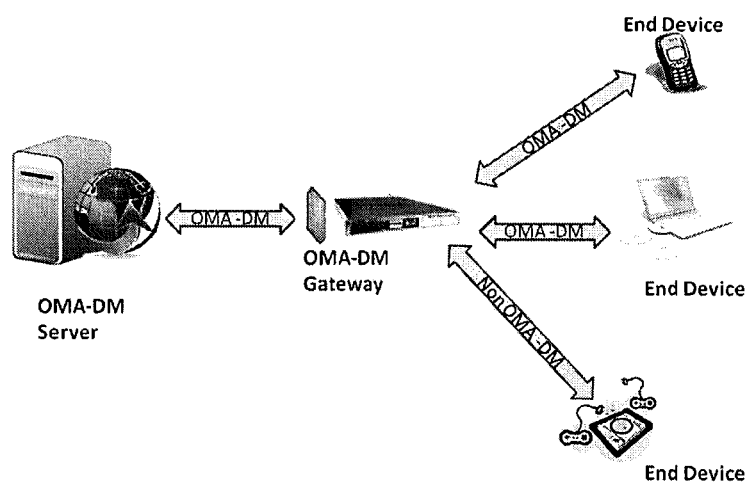
FIG. 1 shows GatewayMO V1.0 (prior art) topology, with just one level of DM Gateway between the DM Server and the End Devices—flat structure.
Figure 2:
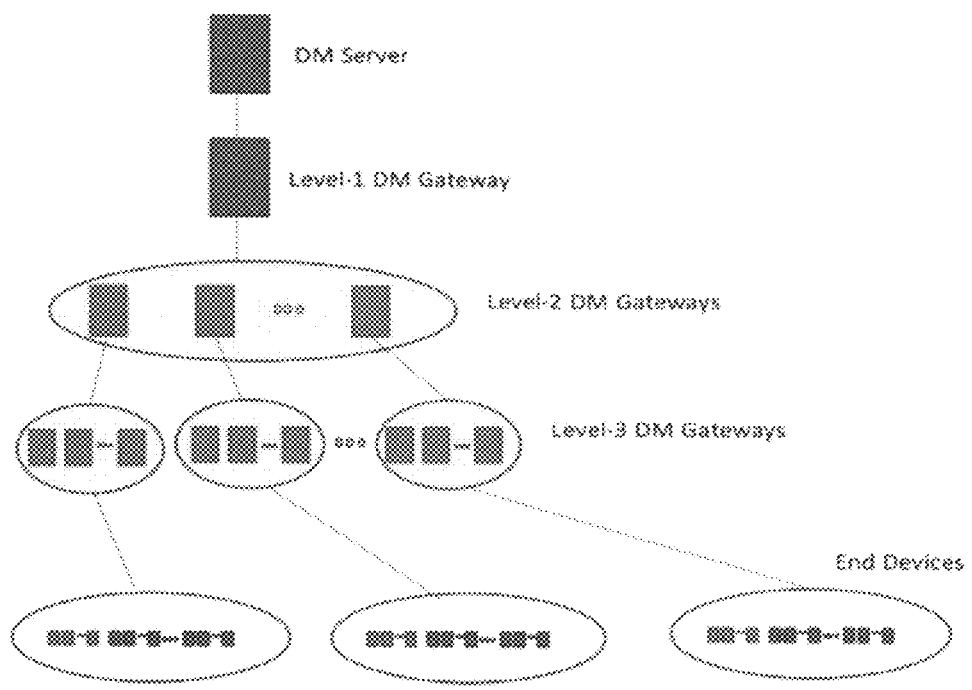
FIG. 2 shows GatewayMO V1.1 which is Hierarchical Architecture tree-like topology containing multiple levels of DM Gateway between the DM Server and the End Devices. In HA, a DM Gateway can be directly associated to many child DM Gateways and/or many regular End Devices, in its immediate lower level.

Reference will now be made in detail to the embodiments, examples of which are illustrated in the accompanying drawings, wherein like reference numerals refer to the like elements throughout. The embodiments are described below to explain the present disclosure by referring to the figures.

As discussed above, Hierarchical Architecture of DM Gateways (HA) proposed in GwMO V1.1 is able to increase the scalability and flexibility on the previous version GwMO V1.0 [GwMO_TS_V10]. Thus, the present disclosure provides a method to enable hierarchical architecture for DM gateways V1.1. This disclosure introduces a new node ComponentType in the GwMO V1.0 Device Management tree [DM_TND] and describes how ComponentType is able to realize HA by leveraging previously existing GwMO V1.0 functionality.

In order to support the Hierarchical Architecture, the following requirements have been raised in GwMO V1.1, for the following areas:

HLF—High Level Functional;
DI—Device Inventory;
Group—Device Group;
DCIS—Device Configuration & Images Storage.

TABLE 1

GwMO V1.1 Requirements for Hierarchical Architecture

| Label | Description |
| --- | --- |
| 1. GwMO-HLF-008 | DM Server SHALL be able to manage an End Device via one or more DM Gateways in a tree branch. |
| 2. GwMO-HLF-009 | DM Server SHALL be able to manage a DM Gateway via one or more other DM Gateways in a tree branch. |
| 3. GwMO-DI-006 | DM Server SHALL be able to query a parent DM Gateway to obtain specified information of a Child DM Gateway, |
| 4. GwMO-DI-007 | DM Server SHALL be able to query a parent DM Gateway to obtain summarized information pertaining to all Child DM Gateways |
| 5. GwMO-DI-008 | A parent DM gateway SHALL provide status, attached or detached, of the registered Child DM Gateways. |
| 6. GwMO-DI-009 | A parent DM Gateway SHALL be able to inform the DM Server about the newly registered Child DM Gateways. |
| 7. GwMO-DI-010 | DM Server SHALL be able to configure a parent DM Gateway to either inform or not the DM server of newly registered Child DM Gateways. |
| 8. GwMO-Group-002 | DM Server SHALL be able to manage device groups, composed of End Devices and/or Child DM Gateways. |
| 9. GwMO-DCIS-004 | GwMO Enabler SHALL support the ability to store data from the DM Server on the DM Gateway (for example, Delivery Package for SCOMO) for local retrieval by End Devices and/or Child DM Gateways. |
| 10. GwMO-DCIS-005 | GwMO Enabler SHALL provide an optimized and configurable mechanism to store data on a DM Gateway (for example, Delivery Packages for SCOMO), if the data are the same for End Devices and/or Child DM Gateways. |
| 11. GwMO-DCIS-006 | GwMO Enabler SHALL allow the DM Server to configure whether the data (for example, Delivery Packages to SCOMO) can be stored on a DM Gateway for local recovery by End Devices and/or Child DM Gateways. |

Figure 3:
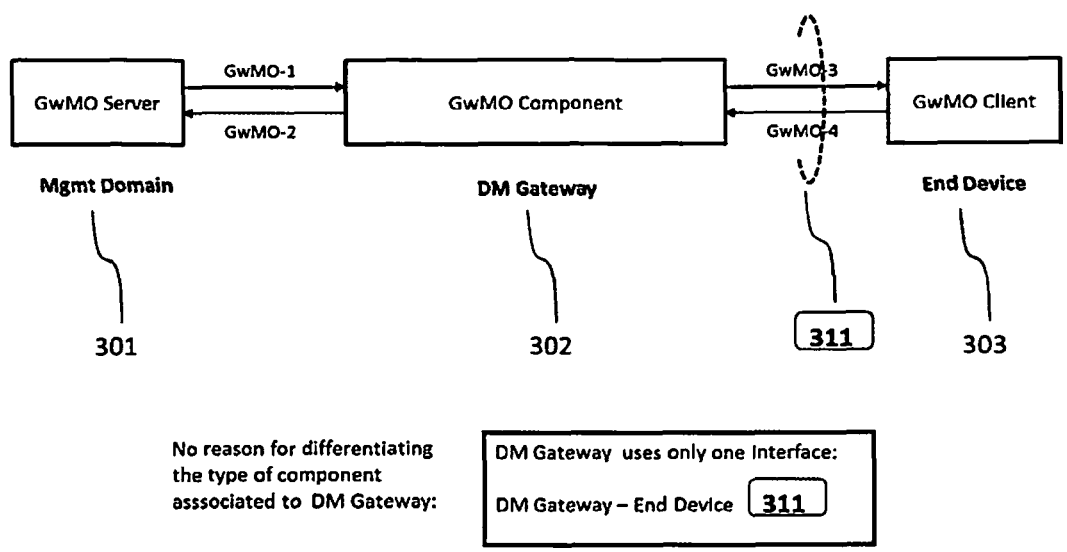
FIG. 3 shows the Architecture Design (AD) for GwMO V1.0, in this architecture a GwMO component may only be associated with a GwMO Client component, so there is just one type of interface: the DM Gateway-End Device Interface 311.

Architecture Document (AD) GwMO V1.0, shown in FIG. 3, previously describes just one interface: the DM Gateway—End Device Interface 311. So, there were no reasons for differentiating interfaces in V1.0, since just one type of component was associated to DM Gateway 302, the End Device component 303.

Figure 4:
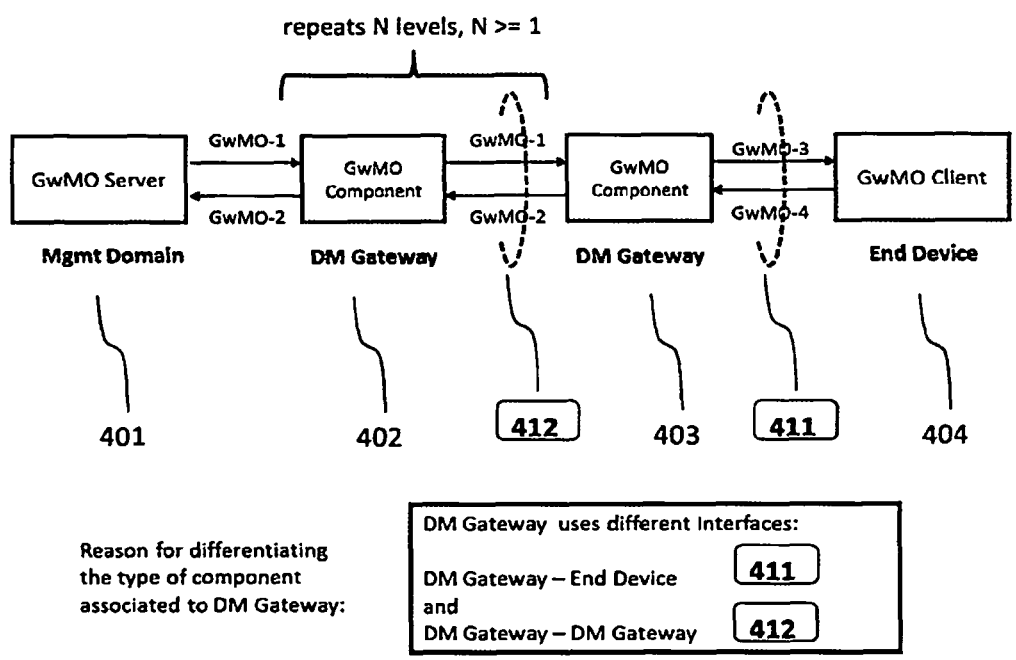
FIG. 4 presents Architecture Design (AD) for GwMO V1.1—Hierarchical Architecture—In this architecture a GwMO component may be associated to a GwMO client component or to a child GwMO component, so there are two types of interface that must be differentiated: DM Gateway-End Device interface 411 and DM Gateway-DM Gateway interface 412.

Aligned with the HA requirements in Table 1, the GwMO V1.1 Architecture Document (AD) [GwMO_AD_V11], shown in FIG. 4, has extended the interface between DM Gateway—End Device 411 into a new relationship and interface between Parent Gateway—Child Gateway 412.

Due to these differences, a DM Gateway now needs to know which kind of devices it is associated with, in its immediate lower level: either an End Device 404 or a Child DM Gateway 403, in order to invoke/expose the proper interface.

Figure 5:
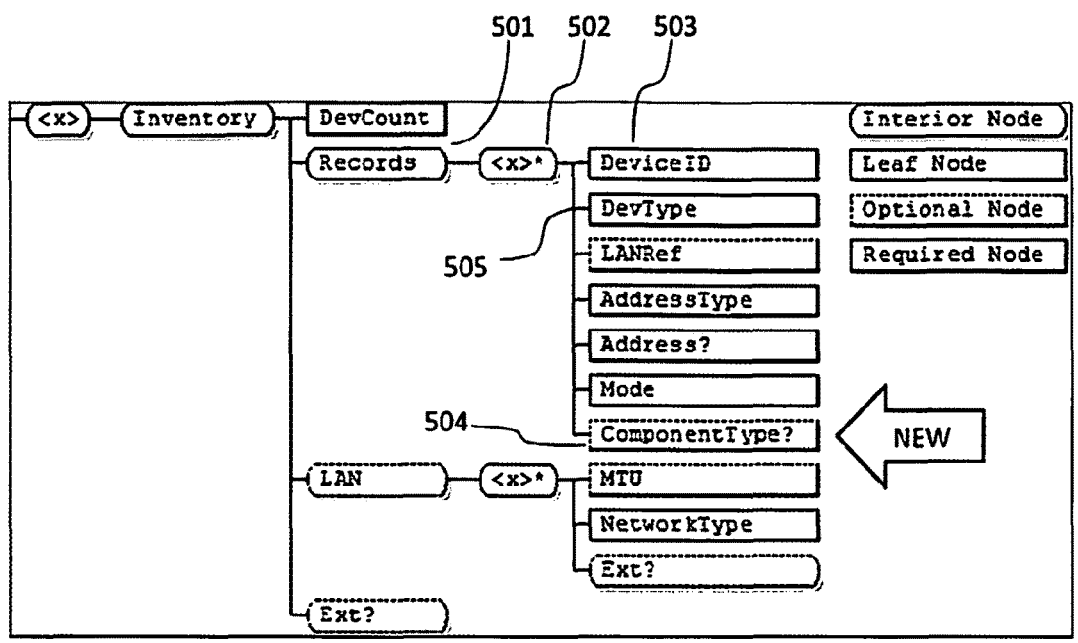
FIG. 5 presents the Inventory MO—Including the new node ComponentType to enable Hierarchical Architecture.

In GwMO, the "Inventory MO", shown in FIG. 5, is used to maintain a list of devices in the network that are managed through the DM Gateway. In GwMO, each End Device entry and its related information are stored inside the Records sub-tree 501.

That Inventory MO is updated when the DM Gateway becomes aware of a new End Device in the network or the DM Gateway becomes aware that a previously subtending End Device is no longer present in the network. That must be extended to Child DM Gateways in HA, besides the End Devices. In those cases, the Records entries 502 are inserted, updated, or removed by the GwMO Enabler.

In order to meet the above requirements [GwMO_RD_V11] and architecture [GwMO_AD_V11] for HA, there is a need to differentiate the Device Inventory entries regarding which type of device a DM Gateway is associated to, in the immediate lower-level:

An End Device.
A Child DM Gateway.

I—Defining New Node ComponentType to Differentiate the Type of Device Associated to a DM Gateway The present disclosure proposes a simple approach to introduce a new ComponentType leaf node 504 to be added under every Inventory Records entry 502, and aligned with the sibling node DeviceID 503, which contain the public identifier Device, as follows:

<x>/Inventory/Records/<x>/ComponentType

| Status | Tree Occurence | Format | Min. Access Types |
|---|---|---|---|
| Optional | ZeroOrOne | int | Get |

If Hierarchical Architecture is supported, the value of this leaf node indicates the type of GwMO component directly associated with this DM Gateway:

| Value | Meaning | Description |
|---|---|---|
| 0 | End Device | An End Device is directly associated to this DM Gateway |
| 1 | DM Gateway | A child DM Gateway is directly associated to this DM Gateway |
| >=2 | Reserved for future use | Reserved. |

The value of this node MAY be used to support DM Gateway features configuration and Device Group in Section 6.2 Gateway Config MO. If this node is absent, it is assumed by default that ComponentType is an End Device (i.e., value 0).

This new leaf node is defined as an optional node, assuming default value=0 (ie, End Device) when it is absent, backward compatible with GwMO V1.0. It was also defined as Integer type, rather than a Boolean, so it makes room for defining different types of End Devices or different types of DM Gateways, for example a Zigbee gateway or a Bluetooth gateway.

The present disclosure will also demonstrate how the differentiation by ComponentType on the devices directly connected to the DM Gateway, in the immediate lower-level (either an End Device or a Child Gateway), leveraged by previously existing functionality available in GwMO V1.0 [GwMO_TS_V10] can enable the HA requirements described in Table 1.

Figure 6:
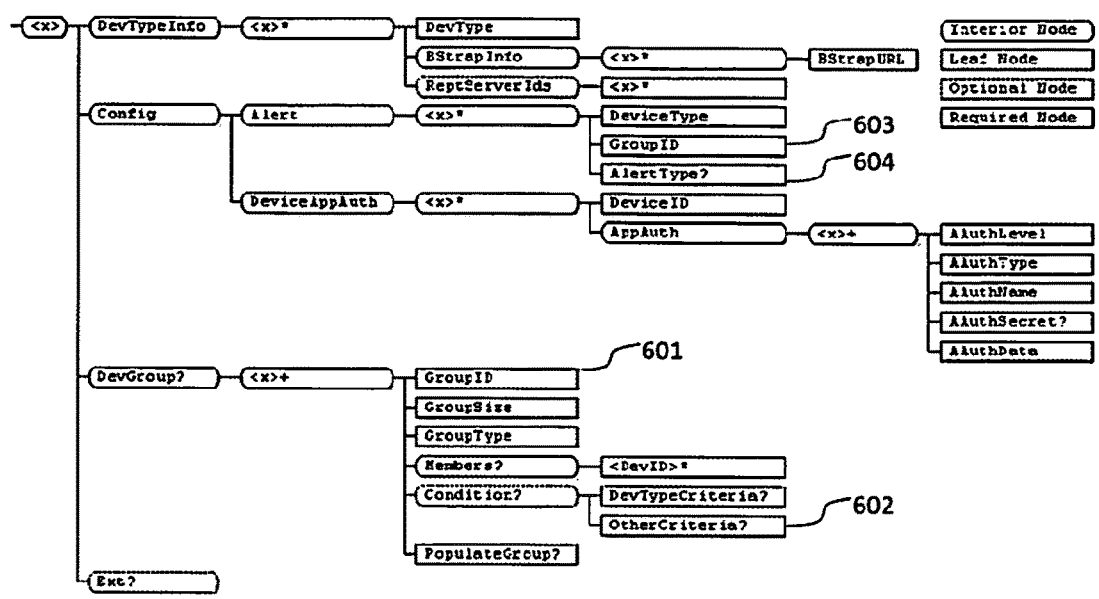
FIG. 6 presents Gateway Config MO.

II—Defining a DeviceGroup which Will Use ComponentType as a Grouping Criteria to Create Specific Groups for Child DM Gateways and End Devices In GwMO, the "Gateway Config MO", shown in FIG. 6, is used to maintain information regarding the handling of different types of End Devices by DM Gateway, based on specified Device Groups.

The information includes the required configuration for: command fanouts, bootstrapping, report alerts, and authentication.

A key point is how DM Gateways can be grouped. Once a DM server and DM Gateway identify the group of child DM Gateways properly, they can properly handle Alerts, Image Fanout, Command Fanout, and Response Aggregation in the same way as GwMO V1.0.

GwMO V1.0 has previously provided a flexible mechanism to define a group of Devices, associating a GroupID 601 to a criteria 602, as follows:

<x>/DevGroup/<x>/GroupID

| Status | Occurence | Format | Min. Access Types |
|---|---|---|---|
| Required | One | Chr | Get, No Replace |

The value of this node specifies the device group identifier. This value must be unique within the Management Tree of the DM Gateway. The value of this node must be set by the DM Gateway.

The DM Gateway should follow some naming conventions for device groups to ensure that the device group identifier does not clash with any End Device identifier.

<x>/DevGroup/<x>/Condition/OtherCriteria

| Status | Occurrence | Format | Min. Access Types |
|---|---|---|---|
| Required | ZeroOrOne | Chr | Get, Replace |

The value of this leaf node is the condition expression that the DM server wants the End Device to fulfill. The value of this node is set by the DM Server.

The expression is defined using the following ABNF syntax:

```
Expression = Condition *(( "|" / "&" ) Condition)
Condition = CondStr / "(" CondStr ")"
CondStr = URI ( "=" / ">" / "<" / "!=" ) Value
   ; Definition of URI is as per the TND spec
Value = ValueStr / "(" ValueStr ")" / \" ValueStr \"
```

-continued

```
ValueStr = 1*ValueChar
ValueChar = ALPHA / DIGIT / "+" / "_" / "." / " "
```

An example of the value of this node is:

(./A/B/Software1/VERSION = 1.20 |./A/B/Software1/VERSION < 1.20) & ./A/DevDetail/DevType=Smartphone.

This node is mutually exclusive with the <x>/DevGroup/<x>/Condition/DevTypeCriteria node By using this flexible mechanism, we may create a specific GroupID value, which represents a group of child DM Gateways and a criteria based on the new node ComponentType. Example:

- <x>/DevGroup/<x>/GroupID 601 ="Gateways"
- <x>/DevGroup/<x>/Condition/OtherCriteria 602 = <x>/Inventory/Records/<x>/ComponentType=2 (i.e. DM Gateway)

Or even combining ComponentType with other Inventory MO fields:

- <x>/DevGroup/<x>/GroupID 601 ="Smartphone_GW"
- <x>/Inventory/Records/<x>/ComponentType 602 = 2 (i.e., DM Gateway)&<x>/Inventory/Records/<x>/DevType ="smartphone".

Figure 7:
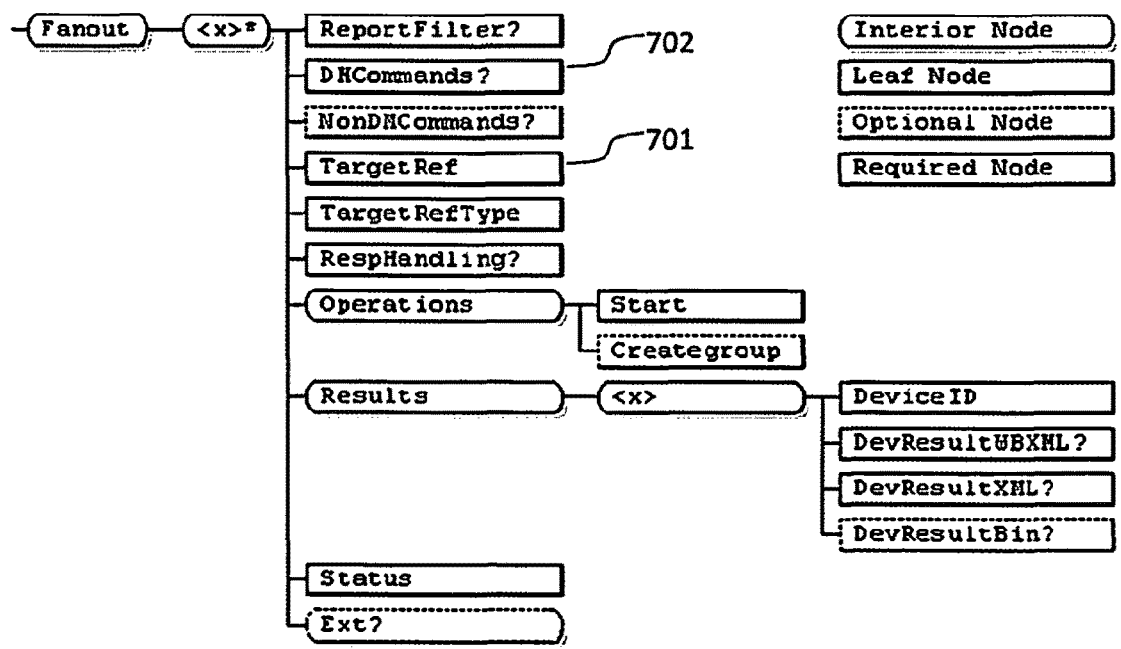
FIG. 7 presents Fanout MO as also part of GwMO MD and resides in DM gateway component.

III—Using Defined GroupType for Performing Command Fanout and Response Aggregation with Gateways in HA In GwMO, the "fanout MO", shown in FIG. 7, is used to maintain information about the movement of fanout DM command and aggregation response.

Once a Device Group is defined, it is possible for DM server, for example, to issue fanout commands 702 to many child DM Gateways at the same time, if they belong to the same group as well as aggregate responses to be returned as single responses back to the DM Server. That may be accomplished by setting the TargetRef 701 node below with the value of the DevGroup/GroupID previously defined 601.

Fanout/<x>/TargetRef

| Status | Occurrence | Format | Min. Access Types |
| --- | --- | --- | --- |
| Required | One | Chr | Get, Replace |

The value of this leaf node specifies the intended target of the DM commands stored in the DMCommands' node. Depending upon the value of the 'TargetRefType' node, the DM Gateway will either issue the DM commands to the targeted End Device specified by the DeviceID node in the Device Inventory MO, or it will issue the DM commands to a device group specified by a GroupId node in the Gateway Config MO.

That enables the following group management requirements using command Fanout and response aggregation:

In GwMO-Group-002, DM Server shall be able to manage device groups, composed of End Devices and/or Child DM Gateways.

Once a gateway group is defined, it is possible to DM Server issue management commands to query information about many gateways simultaneously:

In GwMO-DI-007, DM Server shall be able to query a parent Gateway DM to obtain summarized information pertaining to all child DM Gateways.

IV—Commanding Fanout with Gateway Groups to Distribute Specific SW Images for Gateways in HA Based on the same command Fanout mechanism, DM Server is also able to deliver specific images for child DM Gateways, once GroupID is properly defined.

This enables the following requirement for group provisioning:

In GwMO-DCIS-005, GwMO Enabler shall provide an optimized and configurable mechanism to store data on a DM Gateway if the data are the same for End Devices and/or Child DM Gateways.

V—Configuring Different Alerts from Child DM Gateways or End Devices in HA to be Reported to DM Server In GwMO, the "Gateway Config MO", shown in FIG. 6, also maintain the configurations about which alerts should be forwarded to DM Server based on GroupID the device belongs to.

In order to configure alerts for specific Groups of Child DM Gateways, the following functionality is available:

<x>/Config/Alert/<x>

| Status | Occurrence | Format | Min. Access Types |
| --- | --- | --- | --- |
| Required | ZeroOrMore | node | Get |

This placeholder node groups the configuration parameters for the reporting of Generic Alerts based on some criteria (e.g., alert type, device type, or device group). This node must contain the DEVTYPE child node or GroupID child node, but not both.

<x>/Config/Alert/<x>/GroupID

| Status | Occurrence | Format | Min. Access Types |
| --- | --- | --- | --- |
| Required | ZeroOrMore | chr | Get |

The value of this leaf node specifies the GroupID, which is specified in the DevGroup sub-tree of this MO.

This node is mutually exclusive with its sibling node DevType.

By properly configuring Alerts with different End Device groups and Child DM Gateways groups, setting properly the GroupID 603, DM gateway node will be able to generate different AlertsTypes 604 for the SM Server.

This enables the following requirements for Alerts:

In GwMO-DI-008, a parent DM Gateway shall provide status, attached or detached, of the registered child DM Gateways. The attached/detached alert is provided by 301 (GwMO-2).

In GwMO-DI-009, a parent DM Gateway shall be able to inform the DM server about the newly registered child DM Gateways—new gateway register alert provided by 301 (GwMO-2).

VI—Managing MD Devices Gateways and Terminals in HA

According to the requirements, GwMO V1.1 Architecture Document (AD) [GwMO_AD_V11], shown in FIG. 4, has extended the previously existing interface between DM Gateway-End Device 411 into a new relationship between Parent DM Gateway—Child DM Gateway 412. Thanks to the introduction of new ComponentType node, a DM Gateway will be able to define which kind of devices it is associated to, in its immediate lower level, either an End Device or a Child Gateway, in order to invoke/expose the correct interface.

ComponentType="End Device": DM Gateway must use the interface 411 (DM Gateway-End Device):
  Invoke the interface GwMO-3: for example, to execute DM Commands in the End Device.
  Expose the interface GwMO-4: for example, to receive alerts from End Device.

ComponentType="Child DM Gateway": DM Gateway must use interface 412 (DM Gateway—DM Gateway):
  Invoke interface GwMO-1: for example, to execute DM commands on Child DM Gateway.
  Expose the GwMO-2 interface: for example, to receive alerts from Child DM Gateways.

That enables the below requirements related to DM commands to be delivered across Gw-Gw and Gw-End Devices interfaces along the HA, including reading values, writing values, and executing of scripts/commands on specific nodes residing inside Gateways or End Devices, as follows:

In GwMO-HLF-008, DM Server shall be able to manage an End Device via one or more DM gateways in a tree branch. Using of 412 (GwMO-1) for routing commands between Gw-Gw and 411 (GwMO-3) for the Gateway to command to End Device.

In GwMO-HLF-009, DM Server shall be able to manage a DM Gateway via one or more other DM Gateways in a tree branch.—412 (GwMO-1) for routing commands between Gw-Gw in HA tree and delivering the command to the target DM Gateway.

In GwMO-DI-006, if GwMO Enabler supports [GwMO-HLF-007], then a DM Server shall be able to query a parent DM Gateway to obtain specific information of a child DM Gateway.—using 412 (GwMO-1) for a read command.

In GwMO-DI-010, DM Server shall be able to configure a parent DM Gateway to either inform or not inform the DM Server of newly registered child DM Gateways—configuration using 412 (GwMO-1) for a write command.

In GwMO-DCIS-004, GwMO Enabler shall support the ability to store data from the DM Server on the DM Gateway, for local retrieval by End Devices and/or Child DM Gateways.—use interface 411 (GwMO-3) to write images from DM Gateway into the End Devices).

In GwMO-DCIS-006, Enabler shall allow the DM Server to configure whether the data can be stored on a DM Gateway for local retrieval by End Devices and/or Child DM Gateways.—use interface 412 (GwMO-1) for a write command to set that configuration.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although the present disclosure has been described in connection with certain preferred embodiments, it should be understood that it is not intended to limit the disclosure to those particular embodiments. Rather, it is intended to cover all alternatives, modifications and possible equivalents within the spirit and scope of the invention as defined by the appended claims.

What is claimed is:

1. A method for enabling Hierarchical Architecture of device management gateways, the method comprising:
  differentiating whether an End Device or Child DM Gateway type of a device is associated with an immediate lower level of a Device Management (DM) Gateway, by adding a ComponentType leaf node in a Gateway Management Object (GwMO) Device Tree (DM TND), and
  supporting the Hierarchical Architecture, in which a DM Gateway uses different interfaces, depending on whether the DM Gateway is associated with an End Device or a child DM Gateway, respectively,
  wherein the ComponentType leaf node is added to each entry in a Gateway Inventory Record, and is aligned with a sibling node DeviceID, which contains a public identifier of the device, and
  the DM Gateway is able to make use of the ComponentType field associated with the device related to invoke/expose the correct interface.

2. The method for enabling Hierarchical Architecture of device management gateways, according to claim 1, wherein a management protocol between a Server, the Gateways, and the End Device is Open Mobile Alliance Device Management (OMA-DM).

3. The method for enabling Hierarchical Architecture of device management gateways, according to claim 1, wherein the method is applied or extended to other standards and protocols for management of device and Machine to Machine communication (M2M).

4. The method for enabling Hierarchical Architecture of device management gateways, according to claim 1, wherein the new ComponentType leaf node defined in the DM Gateway is responsible for the differentiation of what type of component is associated with the DM Gateway, which is part of a next lowest level of the Hierarchical Architecture, wherein the new ComponentType leaf node can assume different values for "End Device", "Child DM Gateway" or "Restricted".

5. The method for enabling Hierarchical Architecture of device management gateways, according to claim 1, wherein the ComponentType leaf node is an optional node, and a default type is assumed for the child device.

6. The method for enabling Hierarchical Architecture of device management gateways, according to claim 5, wherein the child device type "End Device" is assumed as the default type when the ComponentType leaf node is absent.

7. The method for enabling Hierarchical Architecture of device management gateways, according to claim 1, wherein the ComponentType leaf node is set as a node of type Integer, and integer values including "Reserved" in order to open space for a definition of different types of End Device or different types of DM gateways when necessary.

8. The method for enabling Hierarchical Architecture of device management gateways, according to claim 7, wherein non-OMA-DM Gateways, as well as non-OMA-DM End Devices are connected as leaves on the Hierarchical Architecture, and treated as simple End Devices with the DM Gateway, to which they are associated operating in Adaptive Mode ("Adaptation Mode").

9. The method for enabling Hierarchical Architecture of device management gateways, according to claim 1, further comprising:
creating groups of specific devices for End Devices and child DM Gateways, according to a Criteria node, based on ComponentType, or a combination between ComponentType and other Inventory Records entry nodes.

10. The method for enabling Hierarchical Architecture of device management gateways, according to claim 1, further comprising:
enabling the Hierarchical Architecture for the "Group" and "Device Inventory" (DI) [GwMO_RD_V11] requirements, which are related to "Fanouts of DM Commands" and "Aggregation response" with DM Gateways in Hierarchical Architecture through the use of predefined groups of specific devices for End Devices and Child DM Gateways,
wherein a DM Server is able to issue the command fanout to many Child DM Gateways at the same time, if they belong to the same group as well as the aggregation responses to be returned as only one reply message to the DM Server.

11. The method for enabling Hierarchical Architecture of device management gateways, according to claim 10, further comprising writing the value of a predetermined DevGroup on a TargetRef node.

12. The method for enabling Hierarchical Architecture of device management gateways, according to claim 1, wherein, once DevGroups are suitably defined, allowing a DM command issued by a DM Server to be propagated cascading down along levels of the hierarchical architecture tree, and across intermediate DM Gateways, by recursive application of a "command fanout" mechanism along the levels of the Hierarchical Architecture.

13. The method for enabling Hierarchical Architecture of device management gateways, according to claim 1, wherein the command response is sent back to a DM server, and the response is cascaded up along levels of the Hierarchical Architecture by recursive application of an "aggregation response" mechanism along the levels of the Hierarchical Architecture.

14. The method for enabling Hierarchical Architecture of device management gateways, according to claim 1, further comprising supplying and delivering specific images or software packages for child DM Gateways while using a "fanout of DM commands" mechanism.

15. The method for enabling Hierarchical Architecture of device management gateways, according to claim 1, wherein the hierarchical architecture enabling for "Device Inventory" (DI) requirements [GwMO_RD_V11] related to handling different DM Alerts with Gateways in Hierarchical Architecture using specific predefined devices Groups for End Devices and Child DM Gateways by a DM Server, receive specific Alerts from Child DM Gateways, depending on the groups created based on the ComponentType leaf node.

16. The method for enabling Hierarchical Architecture of device management gateways, according to claim 1, further comprising:
configuring specific Alerts for different End Device groups and child DM Gateways groups, by setting a GroupID node,
wherein the DM Gateway is able to send different Types of DM Alerts specified in Alertstypes for DM Server for different GroupIDs.

17. The method for enabling Hierarchical Architecture of device management gateways, according to claim 1, wherein, while DM Alerts can be used to update the Inventory fields of DM Gateway, including the ComponentType leaf node, depending on the type of alert received,
wherein the DM alerts update inventory information at different levels of DM Gateways, as the DM alerts are propagated up in the Hierarchical Architecture towards a DM Server.

* * * * *